(12) United States Patent
Harris

(10) Patent No.: US 8,875,213 B2
(45) Date of Patent: Oct. 28, 2014

(54) VIDEO PLAYER AND PORTABLE COMPUTER WITH DETECTION

(75) Inventor: Scott C. Harris, Rancho Santa Fe, CA (US)

(73) Assignee: Harris Technology LLC, Rancho Santa Fe, CA (US)

(*) Notice: Subject to any disclaimer, the term of this patent is extended or adjusted under 35 U.S.C. 154(b) by 296 days.

(21) Appl. No.: 13/080,622

(22) Filed: Apr. 5, 2011

(65) Prior Publication Data

US 2012/0260302 A1 Oct. 11, 2012

(51) Int. Cl.
| | |
|---|---|
| H04N 7/173 | (2011.01) |
| H04N 21/41 | (2011.01) |
| H04N 21/436 | (2011.01) |
| H04N 21/442 | (2011.01) |
| H04N 21/4722 | (2011.01) |
| H04N 21/482 | (2011.01) |
| H04N 21/414 | (2011.01) |
| H04N 21/4786 | (2011.01) |

(52) U.S. Cl.
CPC ..... *H04N 21/4126* (2013.01); *H04N 21/43615* (2013.01); *H04N 21/44218* (2013.01); *H04N 21/4722* (2013.01); *H04N 21/4828* (2013.01); *H04N 21/4122* (2013.01); *H04N 21/41407* (2013.01); *H04N 21/4786* (2013.01)
USPC .............................. 725/133; 141/153; 141/47

(58) Field of Classification Search
None
See application file for complete search history.

(56) References Cited

U.S. PATENT DOCUMENTS

| | | | |
|---|---|---|---|
| 7,293,279 B1* | 11/2007 | Asmussen ...................... 725/102 |
| 2002/0149705 A1* | 10/2002 | Allen et al. .................... 348/734 |
| 2005/0007351 A1 | 1/2005 | Fabrick |
| 2005/0210020 A1 | 9/2005 | Gunn |
| 2006/0041923 A1* | 2/2006 | McQuaide, Jr. ............... 725/131 |
| 2007/0258704 A1 | 11/2007 | Kobrin |
| 2008/0091529 A1 | 4/2008 | Bailey |
| 2010/0333041 A1 | 12/2010 | Fabrick |

* cited by examiner

*Primary Examiner* — Cai Chen
(74) *Attorney, Agent, or Firm* — Law Office of Scott C. Harris, Inc.

(57) ABSTRACT

A television or computer detects the presence of the other, and takes an action based on that detecting.

14 Claims, 4 Drawing Sheets

VIDEO PLAYER AND PORTABLE COMPUTER WITH DETECTION

BACKGROUND

Different kinds of displays are known. For example, many displays can connect to a computer in order to display the information that has been produced from that computer.

Tablet computers have become popular where the computer is built into the housing behind the display. In these devices, most of the device, e.g., 80% or the area of more of the device, is display. A selectable screen, e.g. a touchscreen, is used to enter commands.

Other portable computers, including smart phones, smart remote controls, and other kinds of portable computers, are also known.

Television systems can be used to watch television that comes either as a real-time program (real-time over a channel) or as an interactive program, such as over the Internet.

SUMMARY

The present application teaches describes interaction between a video screen such as a television displaying a program, and a computer, such as a portable computer, such as a tablet, laptop or smartphone.

DETAILED DESCRIPTION

Figure 1:
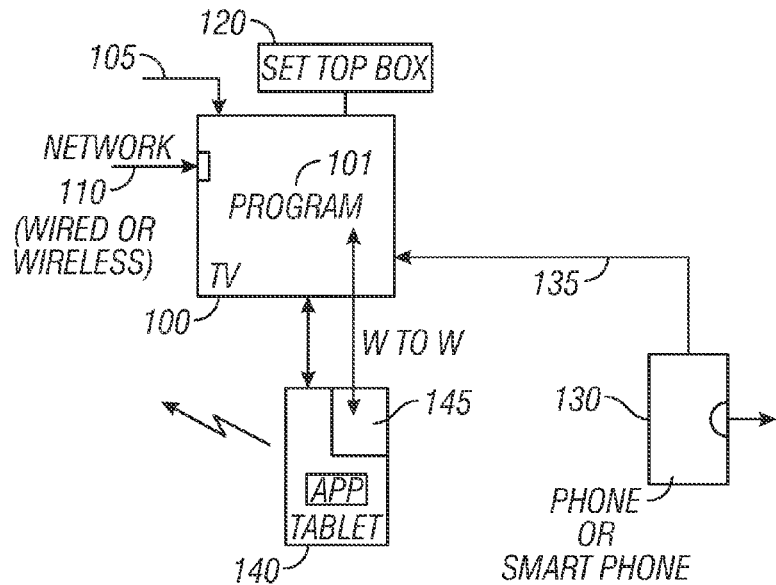
FIG. 1 shows a block diagram of the operation.

FIG. 1 shows a television set 100, receiving program information 105 over a channel which can be cable, broadcast, or any other format. The television set 100 has many different connections beyond the program connection 105. Television 100 is also attached to the network 110 which can be wired or wireless. As conventional, television 100 can have a set top box associated therewith, shown generally as 120. The set top box can be a cable box, TiVo box, or a similar type decoder. The set top box can be physically inserted into the TV, using a format such as a cable card that is plugged into a slot in the TV.

In this embodiment, the television also communicates with one or more smart communication devices that are in range of the television 100. For example, FIG. 1 shows a smartphone 130 within range of the television set. The smart phone is shown communicating with television via 135, and it should be understood that communication can be over any means. For purposes of this embodiment, the communication media over Wi-Fi, in which case both the smartphone 130 and the television 100 may communicate through a router or access point. The communication may also be direct, whereby the smart phone 130 may communicate with TV for example by Bluetooth or some other similar protocol in which case, the TV 100 has a Bluetooth connection. This can also use a line of sight protocol, such as an optical protocol or infrared protocol.

In a similar way, tablet 140 can communicate with the TV, and the program 101 that is shown on the TV 100.

Both the phone 130 and tablet 140 themselves have displays such as the display 145 on the tablet 140. According to one embodiment, the TV 100 sends information to the tablet or smart phone and causes some of that information to be automatically shown on the display. Taking the example of a tablet, the tablet may have a display portion shown as 145. The display portion may show either the currently playing program, or some information associated with the currently playing program, on its display. For example, either a miniature version of the program or a complete version of the program can be shown on the display. In another embodiment, the tablet may download a special application or "app" that facilitates this operation.

In an embodiment, the TV may sense automatically the phone or tablet being within a certain proximity. This can be done using the communication system itself, for example when using Bluetooth, Bluetooth is inherently a short range communication system. Therefore, simply detecting a tablet within Bluetooth range may act as the sensing of the phone or tablet proximity. This may automatically cause the program additional contents to be displayed on the display 145.

In one embodiment, the additional contents that are displayed on the display 145 may be part of the show itself. In another embodiment, the additional contents that are displayed on the display 145 may be special contents that are only available for use on a computer, and are not displayed on the television itself. This enables a paradigm whereby bringing a portable computer such as a tablet within range of the television set actually enhances the viewing of the television program.

Figure 2:
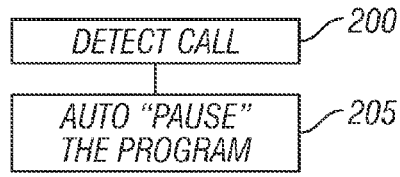
FIG. 2 shows a diagram of detecting a call.

In addition, television may communicate with the tablet, to automatically carry out some action based on operations of the tablet or smart phone. In one embodiment, the smart phone or tablet may receive calls. When the user is receiving a call, the television 100 automatically detects that a call is being received, as shown in the flowchart of FIG. 2 at 200.

205 shows how this causes an automatic pause of the program. The program pause may cause the program to be automatically stopped, and cause additional parts of the program to be automatically stored in the digital video recorder (DVR) function associated with the television; either in the television 100 itself or in the set top box 120.

Both the detection and the auto pause can be done in either the television or in the portable computer. When the user finishes the phone call, the program may continue, with either the television 100 or the portable computer having time shifted the video program. When the television 100 has time shifted the video program, information indicative of that video program is stored in the television during the time that it is pause. The video program can also be time shifted into the portable computer, with the portable computer such as 140 either having its own channel of receiving program information, or receiving program information over the network connection between the tablet 140 in the TV 100. This allows the program to be recorded on the portable device such as 140. In this paradigm, for example, the portable device 140 can receive calls, and also receives television information indicative of the information that the user is watching. When the device receives a call, it automatically sends a pause command to the TV 100, and automatically starts recording the TV. When the call is ended, the program that has been recorded is automatically sent to the TV in order to play the program on the TV.

This embodiment in essence time shifts the program when the user receives a phone call. This may also automatically timeshift a program of this type when the user begins typing a text message, or takes some other kind of action on the portable computer that does or may prevent the user's attention from being on the TV. The user carrying out any action on the portable computer can cause a pause of the program, depending on preferences that can be set. This embodiment may have the television automatically detecting tablet proximity.

Figure 3:
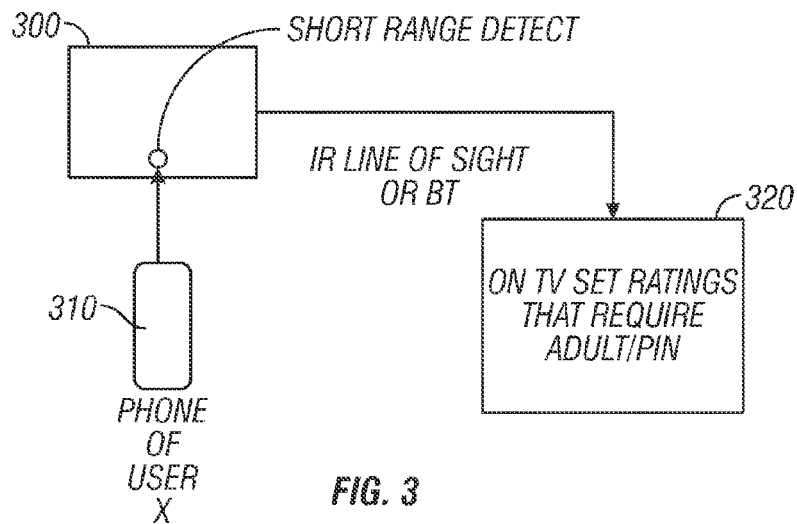
FIG. 3 shows detecting a phone.

Another embodiment shown in FIG. 3, has a television that automatically detects that a user x is watching a program. This can be done as in the first embodiment using a short range detector, e.g. Bluetooth or infrared line of sight that detects the user being close to the TV. Here, the TV 300 is detecting the phone 310 of the user x.

In embodiments, either the phone 310 or the TV 300 or both may sense that the user is watching TV while the phone is within range of the television.

Figure 4:
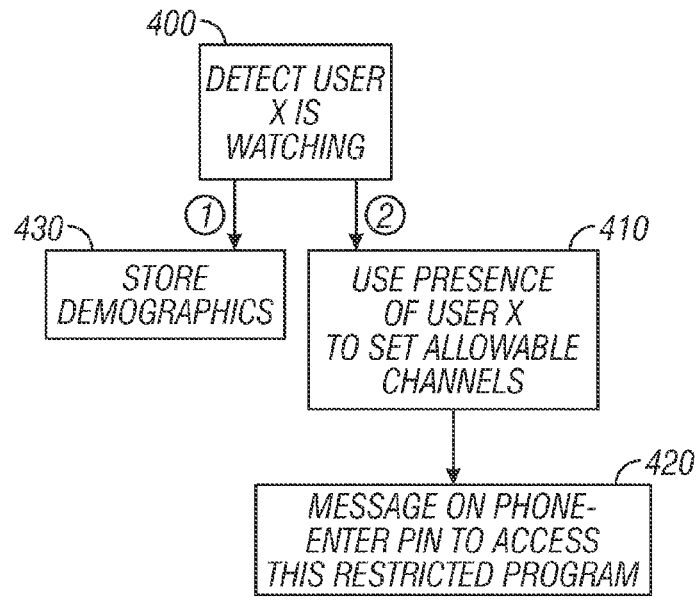
FIG. 4 shows detecting information about a user.

In operation, this is used to carry out a flowchart of FIG. 4, where 400, the system detects that user x is watching, using the above techniques. In one embodiment, the user may have to enter digits on the phone to show that they have not simply taken someone else's phone for example.

At 410, the system uses the presence of user x to set the allowable channels that are displayed for watching. For example, if user x is an adult, then adult-only channels may be displayed, while for three-year-olds, only children's channels may be displayed. In order to access a restricted program, the system may automatically send a message to the phone at 420, saying "enter pin to access the program". This may be done individually for each user, or alternatively, demographics shown as 430 can be used to decide what the users can watch what they are prevented from watching. According to an embodiment, ratings can be set in advance, or can be set, TV itself shown as 320 in FIG. 3

In embodiments, users can watch it currently playing show. Users can also carry out actions, for example, on their computer device. FIG. 1 shows an environment in which there is a television, interacting well just copy the FIG. 1 from the above.

Figure 5:
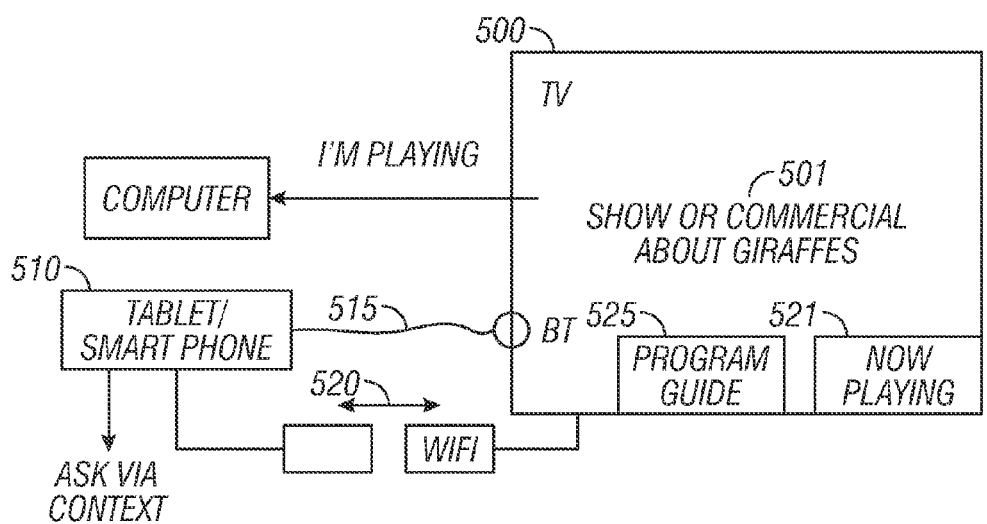
FIG. 5 shows operating in a specific embodiment in which a show is detected.

Another embodiment is illustrated in FIG. 5.

In FIG. 5, the television 500 is shown playing certain information about certain things. For example, the television can be playing information from a currently tuned channel, which can be broadcast TV, cable TV, or some kind of special TV.

As in the above embodiment, there can be a tablet or smart phone 510 that is linked to the television by short range protocol or by 515, e.g., Bluetooth, or by Wi-Fi 520. The communication can be via a paired communication e.g. by Bluetooth pairing, or via a network communication.

Figure 6:
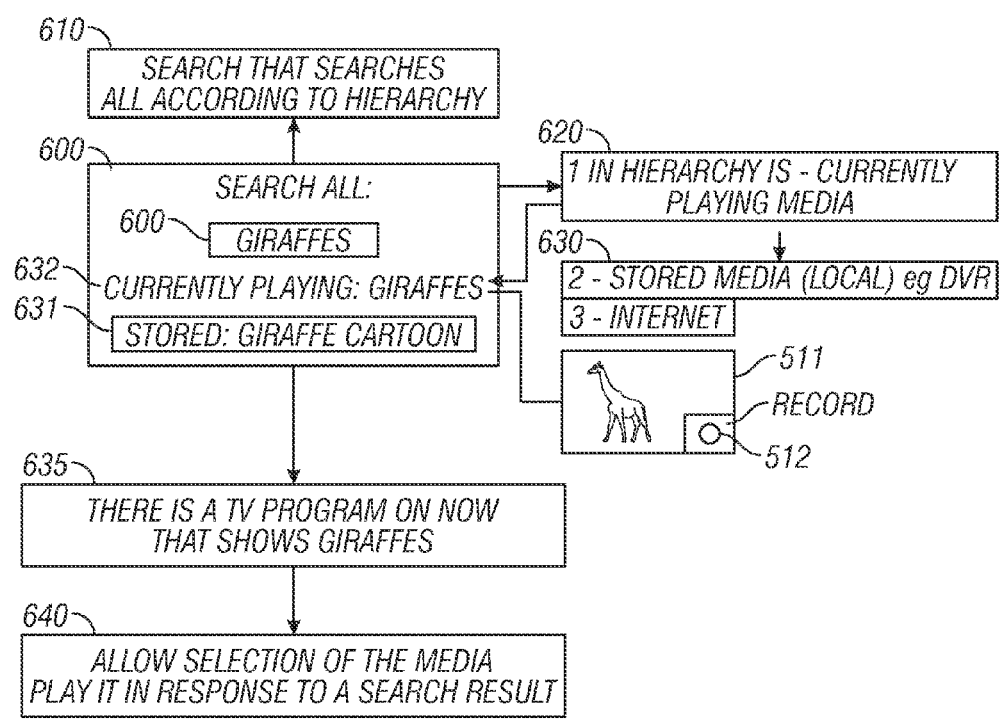
FIG. 6 shows the different contextual operations.

FIG. 6 shows how the tablet or smart phone or computer can carry out a search. For example, the search can be a special search system that searches all media—both local and Internet. In one embodiment, the search searches according to a hierarchy of different forms of media. This will be explained relative to an example. FIG. 5 shows the television show showing the show or commercial about giraffes shown generally as 501. While this is shown on the currently playing channel, it could also be shown on some other channel that is not currently playing, for example only shown on the program guide.

In FIG. 6, the special search box on the computer 600 has a search function. The search function allows a special search, which is described in the context of the specific subject matter shown in FIGS. 5 and 6. In this embodiment, the user searches for the word "giraffes". This causes a search using the smart phone of all of the different databases in range, according to a hierarchy as shown in 610. A search first in the hierarchy may be currently playing media shown as 620. In order to search currently playing media, the system searches from the smart phone to a program guide 525 via one of the network or wireless protocols 515, 520. The database 525 may store for example the program guide that has information about currently playing programs. So, number 1 in the hierarchy may store currently playing media. If the user then searches for "giraffes", the user is automatically returned to a first search result in the currently playing show. The user can select this show, to cause the show to either be shown on TV 500, and/or to cause some version of the show to be played on the screen of the tablet 510.

Number 2 (element 630) in the hierarchy may be stored media, for example DVR stored media. There may be a database 520 called "now claimed" in the television (or in the set top box) that stores this previously recorded information. This may be within a TiVo box or TiVo function, as desired. 630 may search this stored media.

Using the "giraffes" search in 600, a first search result may show a currently airing program about giraffes as item 632, while the second search result may show a previously recorded program about giraffes as item number two; 631. Number three in the hierarchy may search the Internet via any other conventional technique. By doing this, however, the search engine is used to search not only Internet databases, but also information about what is currently airing, and also information about what has been previously recorded and stored. The results shown on the screen 600 may include a number of links, any of which may be selected to actually obtain the item. For example, selecting the length of currently playing giraffes, link 632, causes either the tablet or the TV or both to play the currently airing program 511 about giraffes. While this program is playing, the user may execute the record button 512 to record this program about giraffes, thereby adding it to the now playing database 520.

The item can be played in response to this search result as shown in 640 of FIG. 6.

Figure 7:
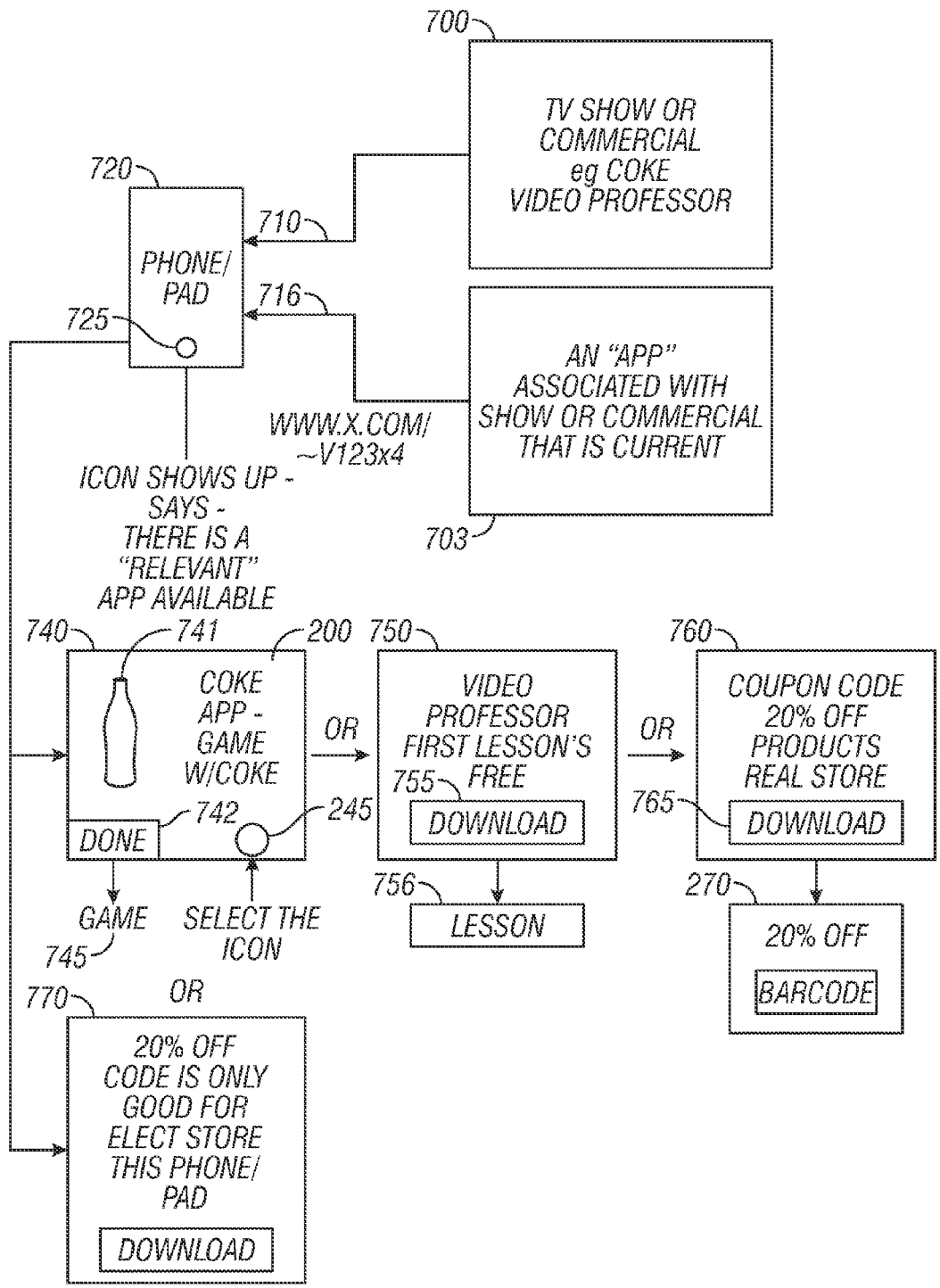
FIG. 7 shows the different possible operations.

Another embodiment is shown in FIG. 7. In this embodiment, the TV device 700 again detects the proximity of a portable computer 720, here again a smart phone or iPad although the portable computer can be any other kind of computer. 700 shows the TV show currently playing. For example, this may be a show about some random object, or can be a commercial for an item such as Coca-Cola.

The smart phone, here 720 is within range of the television 700, or may simply be on the same network as the television set. In an embodiment, a currently playing show that is playing includes an application associated with the currently playing show. When that happens, the television 700 sends a message 710 to the smart phone. This causes a special icon 725, called the "current app icon" 725 to light up. The current app icon 725 being active means that there is an action associated with the commercial that is currently playing (or, one that recently played), that lights up on the device 720. When the icon shows up, it indicates that there is a "relevant" app at 726 that is available for the portable computer 720. This app is relevant in the sense that the TV show that is currently playing has been associated with that TV show that can be used on the portable computer 720.

The user can then, as shown in 740, select the icon. This causes the application to be downloaded and shown on the screen of the device 700. Here, the application that is downloaded can be related to the TV show or commercial. In this example, the downloaded app can be a game related to Coca-Cola shown as 741. After downloading, the user can play the game at 745. The game that is played is related to the subject matter of the commercial that was played. In this way, the user gets relevant information that is contemporaneously received with the commercial.

Another example is shown in 750, where the commercial may be for example for a computer-based operation. Here "Video Professor" may advertise that the first lesson of Video Professor is free. This allows the user to download the video professor application in 755, which causes the free lesson to be shown at 756. In this way, the user can get the first lesson immediately.

In a similar way, there can be coupon codes. Coupon code 760 represents 20% off a product in a real store. The user can download this code by selecting 765. This provides the user with a 70% off single-use barcode. The user can then show the barcode at the store as a coupon, which is scanned to give them a 20% off coupon. The code may be received as an app associated with the TV commercial. Another embodiment in 770 is a 20% off code only good for a web store. This code once downloaded may be keyed to the specific computer 720, so that it can only be used by only that one downloader.

In an embodiment, application information may be provided by providing a special Internet link that is received by the television, for example within the closed captioning or in a supplemental receiver or otherwise encoded within the video. In one embodiment, the link may be encoded within one or more of the video frames, e.g., steganographically. The link may alternatively be received with the video in any way.

FIG. 7 shows the special link 776, and how this may be provided by the special Internet link with a special unique code here http://www.x.com/!U123X4. This link can only be used once and for a certain amount of time. The special link is for example created from some information within the TV commercial, and is downloaded to the phone 770, in a way that causes the link to appear as the download button such as 747. This link is good during the TV commercial, or perhaps for 5 min. after the TV after which time the link no longer works. In another embodiment, the link may be activated when the commercial plays, and deactivated later. In another embodiment, the link may stay active until the computer 720 receives another link. In another embodiment, the links may stay active for a much longer time, e.g. for a week or for the length of time during which the app associated with the television program is available.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example other kinds of displays and/or computers can be controlled in a similar way to detect adjacent display (s) and automatically extend their display.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video playing apparatus comprising:
a video playing device that plays video by producing an output indicative of a video program;
a remote computer sensing device, sensing a proximity of a remote computer; and
a controller, responsive to said sensing said proximity, automatically carrying out a search of multiple different databases within a range of said controller according to a hierarchy among said multiple different databases, and receiving information being indicative of a current program that is playing on said video playing device based on said search and different than information that is being produced as said output indicative of the video program.

2. The apparatus as in claim 1, where said controller operating for detecting that said current program includes additional contents that are to be played on the remote computer that is separate from said video playing apparatus, and is not to be played on said video playing device, and returning said additional contents to said remote computer from said search and showing a first video part on said video playing device and not showing said additional contents on said video playing device.

3. The apparatus as in claim 1, wherein said remote computer includes a telephone function, where said video playing device detects a call being carried out on said remote computer and automatically pauses the playing of the video while said call is ongoing and continues the playing of the video from where said video was paused when said call is ended.

4. The apparatus as in claim 3, wherein said video playing device is playing live video, and where said pauses causes automatic operation of a digital video recorder function to automatically record said live video while said call is ongoing.

5. The apparatus as in claim 1, wherein said remote computer includes a message sending function, where said video playing device detects a user composing a message to send via said message sending function on said remote computer and automatically pauses the playing of the video while said message is being composed and continues the playing of the video from where it stopped when said composing is ended.

6. The apparatus as in claim 5, wherein said video playing device detects the user typing to compose the message and automatically pauses the playing of the video while the user is typing, and where said pauses causes automatic operation of a digital video recorder function to automatically record said live video during said composing.

7. The apparatus as in claim 1, wherein said search is carried out by said video playing device and results are sent from said video playing device to said remote computer.

8. The apparatus as in claim 4, further comprising the remote computer with a phone function, and wherein the remote computer carries out the search.

9. The computer as in claim 1, where said processor operating for detecting that said current program includes additional contents that are to be played on a remote computer that is separate from said video playing apparatus, and is not to be played on said video playing device, and sending said additional contents to said remote computer and not showing said additional contents on said video playing device.

10. A method comprising:
in a video playing device that is playing a video program, sensing a proximity of a remote computer; and
responsive to sensing said proximity, automatically carrying out a search of multiple different databases within a range of said controller according to a hierarchy among said multiple different databases, and receiving information indicative of a current program that is playing on said video playing device but having different content than said current program that is playing based on said search, where said information is different than said video program; and
sensing an action taken on said remote computer and automatically changing a playing of the video based on action on the remote computer.

11. The method as in claim 10, further comprising detecting that said video program includes additional contents that are only used on said remote computer, and are not used on said video playing device, and showing a video on the video playing device, and sending said additional contents to said remote computer and not showing said additional contents on said video playing device.

12. The method as in claim 10, wherein said remote computer includes a telephone function, and wherein the remote computer carries out the search.

13. The method as in claim 10, wherein said video playing device is playing live video, and where said pauses causes automatic operation of a digital video recorder function to automatically record said live video while said call is ongoing.

14. The method as in claim 10, wherein said remote computer includes a message sending function, where said video playing device detects a user composing a message to send via said message sending function on said remote computer as said action and automatically pauses the playing of the video as said changing while message is being composed and resumes the playing of the video from where it stopped when said composing is ended.

\* \* \* \* \*